United States Patent
Tian

(10) Patent No.: US 9,992,717 B2
(45) Date of Patent: Jun. 5, 2018

(54) SERVICE PROCESSING METHOD, NETWORK CONTROLLER AND FORWARDING DEVICE

(71) Applicant: ZTE CORPORATION, Shenzhen, Guangdong Province (CN)

(72) Inventor: Tian Tian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 14/914,812

(22) PCT Filed: May 20, 2014

(86) PCT No.: PCT/CN2014/077878
§ 371 (c)(1),
(2) Date: Feb. 26, 2016

(87) PCT Pub. No.: WO2015/089985
PCT Pub. Date: Jun. 25, 2015

(65) Prior Publication Data
US 2016/0286443 A1  Sep. 29, 2016

(30) Foreign Application Priority Data
Dec. 19, 2013  (CN) .......................... 2013 1 0703616

(51) Int. Cl.
*H04W 4/00* (2018.01)
*H04W 36/02* (2009.01)
(Continued)

(52) U.S. Cl.
CPC ......... *H04W 36/023* (2013.01); *H04L 45/745* (2013.01); *H04W 28/0226* (2013.01);
(Continued)

(58) Field of Classification Search
CPC ..... H04W 36/023; H04W 84/12; H04W 4/08; H04W 36/08; H04L 45/745
(Continued)

(56) References Cited

U.S. PATENT DOCUMENTS

| 7,554,909 B2 | 6/2009 | Raghunath et al. |
| 2007/0036109 A1* | 2/2007 | Kwak ............... H04W 36/0066 370/331 |

(Continued)

FOREIGN PATENT DOCUMENTS

| CN | 101047952 A | 10/2007 |
| CN | 102857416 A | 1/2013 |
| CN | 103166876 A | 6/2013 |

OTHER PUBLICATIONS

Mobile IPv6 Handover Using Home Agent Buffering draft-xia-mipshop-ha-buffering-01; Network Working Group Internet-Draft; F. Xia et al.; May 5, 2009; XP0015060159.
(Continued)

*Primary Examiner* — Faisal Choudhury
(74) *Attorney, Agent, or Firm* — Ling Wu; Stephen Yang; Ling and Yang Intellectual Property

(57) ABSTRACT

Disclosed are a service processing method, a network controller and a forwarding device, wherein the method includes: after learning that a terminal leaves a network, a network controller acquiring information of a home forwarding device when the terminal leaves the network; the network controller determining a caching policy flow table, and sending the caching policy flow table to the home forwarding device. With the embodiment of the present document, in an IP network architecture in which control and forwarding are separated, after a WLAN terminal switches to a new radio access device, the service continuity can be maintained.

10 Claims, 6 Drawing Sheets

(51) Int. Cl.
*H04W 28/02* (2009.01)
*H04L 12/741* (2013.01)
*H04W 80/04* (2009.01)
*H04W 8/02* (2009.01)
*H04W 36/08* (2009.01)
*H04W 84/12* (2009.01)

(52) U.S. Cl.
CPC .............. *H04W 8/02* (2013.01); *H04W 36/08* (2013.01); *H04W 80/04* (2013.01); *H04W 84/12* (2013.01)

(58) Field of Classification Search
USPC .......................................................... 370/331
See application file for complete search history.

(56) References Cited

U.S. PATENT DOCUMENTS

| | | | | |
|---|---|---|---|---|
| 2008/0192701 A1* | 8/2008 | Jeong | .................... | H04W 36/02 370/331 |
| 2009/0303963 A1* | 12/2009 | Bosch | .................... | H04W 36/14 370/331 |
| 2012/0115431 A1* | 5/2012 | Kim | ...................... | H04W 4/021 455/404.1 |
| 2014/0269535 A1* | 9/2014 | Pazhyannur | .......... | H04W 40/24 370/329 |
| 2015/0031364 A1* | 1/2015 | Chen | .................... | H04W 36/023 455/436 |

OTHER PUBLICATIONS

Distributed and Dynamic Mobility Management in Mobile Internet: Current Approaches and Issues; Jounal of Communications, vol. 6.No. 1 ; Feb. 2011; H Anthony Chan et al.; XP002639331.

Fast Handover for Mobile IPv6; Network Working Group, Category: Experimental ; R. Koodli, Ed. Nokia Research Center , Jul. 2005; XP0015041931A.

* cited by examiner

SERVICE PROCESSING METHOD, NETWORK CONTROLLER AND FORWARDING DEVICE

TECHNICAL FIELD

The present document belongs to the field of data communications, and more particularly, relates to a service processing method, a network controller and a forwarding device.

BACKGROUND OF THE RELATED ART

With the development of mobile data networks such as 3G/LTE (Long Term Evolution)/WiFi and the widespread use of smart handheld terminals such as cell phone/tablet PC, various mobile data services develop rapidly, which rapidly promotes the mobile data network from hotspot coverage to hot-zone coverage. Thus, supporting the IP mobility in the hot zone to maintain the user experience has become an indispensable function of the mobile data network.

Currently the WLAN (wireless local area network) uses the base station+base station controller, namely AP+AC (AP Controller), star structure. When a terminal switches between the APs (Access Points), the maintenance of its identity information and the switch of data channel are charged by the AC. With the deployment of 802.11ac products, the air interface rate is about to enter into the era of 1 Gbps. If continuously using the AP+AC star structure, the AC will be under enormous pressure of data forwarding because one AC is generally responsible for managing dozens of to thousands of APs, which has a very high requirement on their routing and forwarding performances, and becomes the data bottleneck. Meanwhile, the bearer network still needs high-performance switches and routers to transmit data. Thus, the service network and the bearer network will form two overlapped networks, this overlapping architecture increases not only the forwarding delay but also the management complexity and failure probability, which even greatly increases the network construction and maintenance costs.

The IP field uses the MIP (Mobile IP) protocol to support the IP mobility, and this protocol requires the client's support and has the triangular routing efficiency problem. To this end, a (Proxy Mobile IP) protocol is developed to let the network side take the entire responsibility for supporting the IP mobility.

As shown in FIG. 1, the PMIP protocol has the MAG (Mobile Access Gateway)+LMA (Local Mobility Anchor) star structure. In the case that the data traffic surges, the LMA becomes the data bottleneck. Besides of requiring both the router and the radio access point supporting the PMIP protocol, its network architecture still forms two overlapped networks of the service network (MAG/LMA supporting the IP mobility) and the bearer network.

The 3GPP (3rd Generation Partnership Project) also uses the terminal-led DSMIP (Dual Stack Mobile IP) protocol whose nature is similar to the MW protocol and which supports the IPv4 and v6. The terminal initiates the DSMIPv6 signaling in the control plane: the MIPv6 signaling may be encapsulated and sent in the IPv4 tunnel. In the data plane, the terminal maintains the data tunnel to the PDN (Public Data Network) GW (Gate Way), and the user data flow is directly forwarded by the terminal to the PDN GW via the GRE (Generic Routing Encapsulation) tunnel. All the above is the overlay network architecture of service network and bearer network.

When a terminal switches between various ports of a router, the current router technology is already able to assign the same IP address to it, but it requires the terminal initiating a DHCP (Dynamic Host Configuration Protocol) process to refresh the data routing of the router and its switch. The DHCP is time-consuming, and the terminal frequently initiating the DHCP is not necessary and also increases the network payload when the switch is frequent. Moreover, for a user using the static fixed IP address, the DHCP process will never be initiated. Before refreshing the ports of the routing/switching table, data sent to the terminal that after the switch will not be properly arrived. This will lead to service discontinuity, even service interruption, after the terminal switches, which severely degrades the user experience.

The currently popular SDN (Software defined network) uses the network architecture in which the control and forwarding are separated, but it does not support the WLAN terminal moving because it does not involve the WLAN network.

SUMMARY

The present document provides a service processing method, a network controller and a forwarding device to maintain service continuity after one WLAN terminal switches to a new radio access device under an IP network architecture in which the control and forwarding are separated.

The present document provides a service processing method, comprising:

after learning that a terminal leaves a network, a network controller acquiring information of a home forwarding device when the terminal leaves the network;

the network controller determining a caching policy flow table, and sending the caching policy flow table to the home forwarding device.

Alternatively, the abovementioned method may further have the following feature: a network controller acquiring information of a home forwarding device when the terminal leaves the network comprises:

in a maintained network-wide access device and home forwarding device correspondence table, the network controller searching for a home forwarding device corresponding to a media access control address of an access device when the terminal leaves the network.

Alternatively, the abovementioned method may further have the following feature: after the network controller acquires the information of the home forwarding device when the terminal leaves the network, the method further comprises:

the network controller saving or updating leaving-network device information of the terminal, wherein the leaving-network device information of the terminal comprises: a leaving-network identifier, a network identifier of the terminal, access device information when the terminal leaves the network, and a network identifier of a corresponding home forwarding device.

The present document further provides a service processing method, comprising:

after learning that the terminal switches, the network controller acquiring information of a home forwarding device before the terminal switches and information of a current home forwarding device of the terminal;

the network controller determining a forwarding policy, and calculating a forwarding path from the home forwarding device before the terminal switches to the current home forwarding device of the terminal; and the network controller generating a forwarding flow table which is used to forward cached data to the current home forwarding device for the home forwarding device before the terminal switches, and issuing the forwarding flow table to the home forwarding device before the terminal switches and forwarding devices on the forwarding path.

Alternatively, the abovementioned method may further have the following feature: a network controller acquiring information of a home forwarding device before the terminal switches comprises:

the network controller searching for leaving-network device information of the terminal according to the network identifier of the terminal, and acquiring the information of the home forwarding device before the terminal switches from the leaving-network device information of the terminal.

Alternatively, the abovementioned method may further have the following feature: a network controller acquiring information of a current home forwarding device of the terminal comprises:

in a maintained network-wide access device and home forwarding device correspondence table, the network controller searching for information of a home forwarding device corresponding to a media access control address of an access device in entering-network information of the terminal.

Alternatively, the abovementioned method may further have the following feature: after the network controller acquires the information of the home forwarding device before the terminal switches and the information of the current home forwarding device of the terminal, the method further comprises:

the network controller saving or updating entering-network device information of the terminal and deleting leaving-network device information of the terminal, wherein the entering-network device information of the terminal comprises: a network identifier of the terminal, access device information, and a network identifier of a home forwarding device.

The present document further provides a network controller, comprising:

a first module, configured to, after learning that a terminal leaves a network, acquire information of a home forwarding device when the terminal leaves the network; determine a caching policy flow table, and send the caching policy flow table to the home forwarding device; and a second module, configured to: after learning that the terminal switches, acquire information of the home forwarding device before the terminal switches and information of a current home forwarding device of the terminal; determine a forwarding policy, calculate a forwarding path from the home forwarding device before the terminal switches to the current home forwarding device of the terminal; and generate a forwarding flow table which is used to forward the cached data to the current home forwarding device for the home forwarding device before the terminal switches, and issue the forwarding flow table to the home forwarding device before the terminal switches and forwarding devices on the forwarding path.

Alternatively, the abovementioned network controller may further have the following feature:

the first module acquires the information of the home forwarding device when the terminal leaves the network in the following manner: in a maintained network-wide access device and home forwarding device correspondence table, searching for a home forwarding device corresponding to a media access control address of an access device when the terminal leaves the network.

Alternatively, the abovementioned network controller may further have the following feature:

the second module acquires the information of the home forwarding device before the terminal switches in the following manner: searching for leaving-network device information of the terminal according to a network identifier of the terminal, and acquiring the information of the home forwarding device before the terminal switches from the leaving-network device information of the terminal; and the second module acquires the information of the current home forwarding device of the terminal in the following manner: in the maintained network-wide access device and home forwarding device corresponding table, searching for information of a home forwarding device corresponding to a media access control address of an access device in entering-network information of the terminal.

Alternatively, the abovementioned network controller may further have the following feature: the network controller further comprises:

a third module, configured to save or update the leaving-network device information of the terminal, wherein the leaving-network device information of the terminal comprises: a leaving-network identifier, a network identifier of the terminal, access device information when the terminal leaves the network, and a network identifier of a home forwarding device; and save or update the entering-network device information of the terminal and delete the leaving-network device information of the terminal, wherein the entering-network device information of the terminal comprises: a network identifier of the terminal, access device information, and a network identifier of a home forwarding device.

The present document further provides a service processing method, comprising:

a forwarding device receiving a caching policy flow table issued by a network controller; and the forwarding device caching downlink data of a specified terminal according to the caching policy flow table.

Alternatively, the abovementioned method may further have the following feature: after the forwarding device caches the downlink data of the specified terminal according to the caching policy flow table, the method further comprises:

the forwarding device receiving a forwarding flow table issued by the network controller; and the forwarding device forwarding the cached downlink data to the specified forwarding device according to the forwarding flow table.

The present document further provides a forwarding device, which comprises:

a first module, configured to receive a caching policy flow table issued by a network controller, and cache downlink data of a specified terminal according to the caching policy flow table; and a second module, which is configured to receive a forwarding flow table issued by the network controller, forward the cached downlink data to a specified forwarding device according to the forwarding flow table.

The embodiment of the present document provides a service processing method, a network controller and a forwarding device to maintain the service continuity after an WLAN terminal switches to a new radio access device in the IP network architecture in which the control and forwarding are separated.

PREFERRED EMBODIMENTS OF THE INVENTION

Hereinafter in conjunction with the accompanying drawings, embodiments of the present document will be described in detail. It should be noted that in the case of no conflict, embodiments and features in the embodiments of the present application may be arbitrarily combined with each other.

Figure 1:
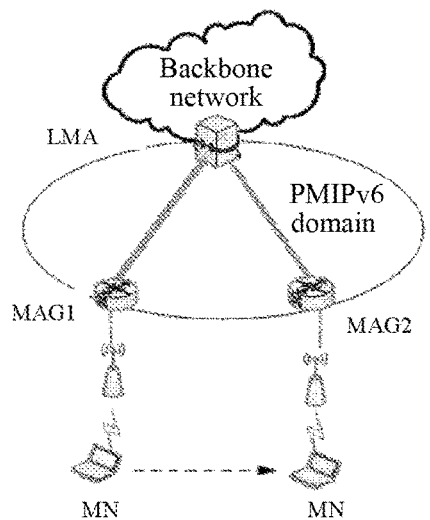
FIG. 1 is a schematic diagram of a typical network architecture related to proxy mobile IPv6 protocol.
Figure 2:
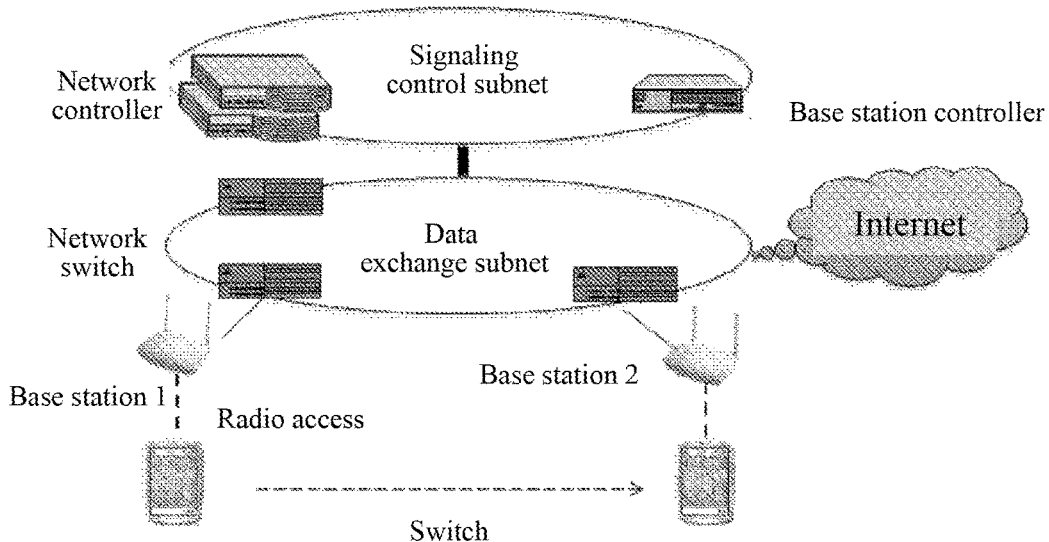
FIG. 2 is a schematic diagram of an IP network supporting the separation of radio access control and forwarding in accordance with an embodiment of the present document.

FIG. 2 is a schematic diagram of an IP network supporting the separation of radio access control and forwarding in accordance with an embodiment of the present document, that is, the system architecture used in the embodiment of the present document. As shown in FIG. 2, the IP network in which the control and forwarding are separated consists of two subnets: a signaling control subnet consisting of one or more network controllers, and a data exchange subnet consisting of a plurality of interconnected network forwarding devices, the forwarding device refers to a variety of switching devices supporting the SDN, including the second-layer and third-layer switches and gateways that supporting the SDN. The signaling control subnet instantly calculates the user's data dynamic exchange strategy and flow table and sends the exchange strategy and the flow table to the data exchange subnet, and the latter forwards the user data according to the exchange policy and the flow table.

The AC is a logical network element that can be deployed independently or integrated in a control subnet. Its main function is user authentication and service control, AP hardware and software management, and AP work state management.

The terminal's data flow is transmitted by the data exchange subnet, and not through the AC.

The AP is directly, or through a simple two-layer switch (refer to a two-layer switch not supporting the control and forwarding separation), connected to the switch of the data exchange subnet, the latter is known as the home switch (or home forwarding device) of the AP.

The related process of an WLAN system terminal entering or leaving a network is: when a terminal joins in the AP, namely entering the network, the identity authentication process starts; when the terminal leaves the AP, namely leaving the network, the WLAN terminal actively sends a leaving-network message according to the IEEE protocol specification, and for the case that some relevant WLAN terminals do not transmit the leaving-network message, that they leave the network can be determined through methods such as by keeping periodic detection alive.

In the embodiment of the present document, the data forwarding device maintains the "local AP-home forwarding device correspondence table", and the network controller maintains the "network-wide AP-home switch correspondence table", entries comprise at least the fields: AP MAC, network identifier of the forwarding device, and the latest join-in time. The abovementioned table can be statically configured, or be maintained through dynamic configuration, for example:

The global vendor's APs have dedicated MAC address segment, the "vendor AP MAC address segment table" is saved in the network controller and the data forwarding device through a pre-configuration or dynamic issuing method, for example, it is downloaded to the network controller by a network management system, and then issued by the network controller to its managed forwarding device.

The data forwarding device matches to the corresponding MAC according to its saved vendor AP MAC address segment table, and establishes and maintains the "local AP-home forwarding device correspondence table", including: adding a newly-issued data AP entry, updating a not-newly-issued-data AP entry, deleting the AP entry which does not transmit or receive data within a given time period or should be compulsorily deleted, and sending the corresponding report information to the network controller.

The network controller maintains the "network-wide AP-home forwarding device correspondence table" according to the report information of the data forwarding device, comprising: adding, updating and deleting an AP entry; the network controller may also decide to delete a certain AP entry according to the policy and notifies the data forwarding device to delete the corresponding entry.

The structure and all fields of the related table in the present embodiment are as follows:

---

"Vendor AP MAC address segment table" (included in both the forwarding device and the controller):
  AP MAC address segment 1, vendor name
  AP MAC address segment 2, vendor name
  ... ...
  "Current MAC address table" (maintained in the forwarding device):
  MAC address 1, the latest active time
  MAC address 2, the latest active time
  ... ...
  "Local AP- home forwarding device correspondence table" (maintained in the forwarding device):
  AP MAC address 1, the latest active time
  AP MAC address 2, the latest active time
  ... ...
  "Network-wide AP-home forwarding device correspondence table" (maintained in the controller):

-continued

```
forwarding device network identifier 1, AP MAC address 1
(the latest active time)
forwarding device network identifier 1, AP MAC address 2
(the latest active time)
forwarding device network identifier 2, AP MAC address 3
(the latest active time)
... ...
```

Wherein, the "vendor AP MAC address segment table" is saved in the network controller and the data forwarding device through a pre-configuration or dynamic issuing method, for example, it is downloaded to the network controller and the data forwarding device manufacturer through the pre-configuration, or downloaded to the network controller through a network management system, and then issued by the network controller to its managed forwarding device. For all the following examples, it is defaulted that the network controller and the forwarding device already save the "vendor AP MAC address segment table".

After the terminal enters or leaves the network, the signaling control subnet uses the following two sources to obtain information of the terminal and of the AP to which it currently belongs, and the information comprises at least: a network identifier of the terminal and a network identifier of the AP, it may also comprise other relevant information of the terminal and the AP (such as, the current air interface rate of the terminal and the AP, information of the adjacent AP, etc.):

1) reported by the AP;
2) reported by the AC.

Figure 3:
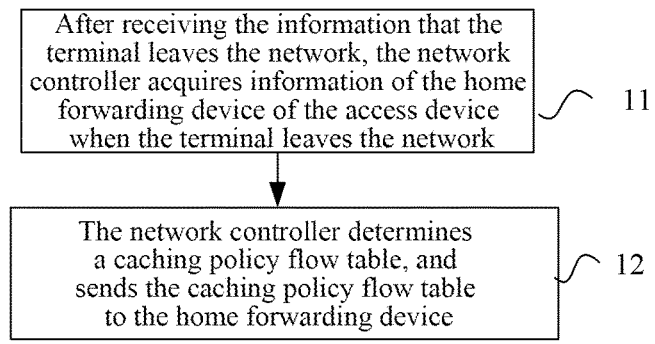
FIG. 3 is a flow chart of a service processing method at the network controller side in accordance with an embodiment of the present document.

FIG. 3 is a flow chart of a service processing method at the network controller side in accordance with an embodiment of the present document, as shown in FIG. 3, the method of the present embodiment comprises:

in step 11, after learning that the terminal leaves the network, the network controller acquires information of the home forwarding device when the terminal leaves the network;

in step 12, the network controller determines a caching policy flow table, and sends the caching policy flow table to the home forwarding device.

Figure 4:
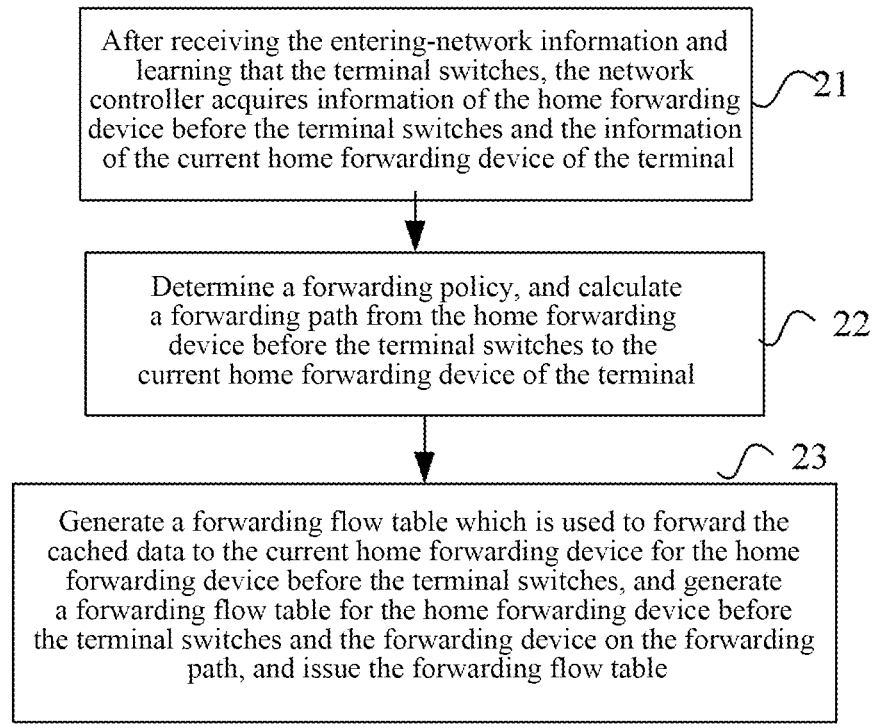
FIG. 4 is a flow chart of the service processing method at the network controller side in accordance with another embodiment of the present document.

FIG. 4 is a flow chart of the service processing method at the network controller side in accordance with another embodiment of the present document, and as shown in FIG. 4, the method of the present embodiment comprises:

in step 21, after learning that the terminal switches, the network controller acquires information of the home forwarding device before the terminal switches and the information of the current home forwarding device of the terminal;

in step 22, the network controller determines a forwarding policy, and calculates a forwarding path from the home forwarding device before the terminal switches to the current home forwarding device of the terminal;

in step 23, the network controller generates a forwarding flow table which is used to forward the cached data to the current home forwarding device for the home forwarding device before the terminal switches, and issues the forwarding flow table to the home forwarding device before the terminal switches and forwarding devices on the forwarding path.

Figure 5:
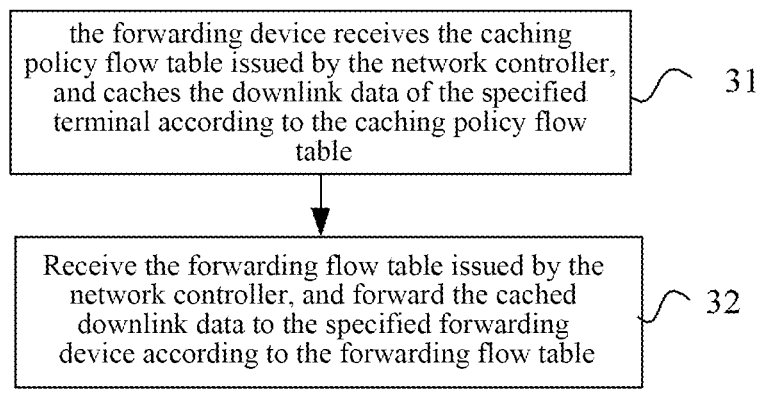
FIG. 5 is a flow chart of the service processing method at the forwarding device side in accordance with an embodiment of the present document.

FIG. 5 is a flow chart of the service processing method at the forwarding device side in accordance with an embodiment of the present document, as shown in FIG. 5, the method of the present embodiment comprises:

in step 31, the forwarding device receives the caching policy flow table issued by the network controller, and caches the downlink data of the specified terminal according to the caching policy flow table.

In step 32, the forwarding device receives the forwarding flow table issued by the network controller, and forwards the cached downlink data to the specified forwarding device according to the forwarding flow table.

In this embodiment, when the terminal leaves the network, the signaling control subnet searches for the home network device corresponding to the AP in the leaving-network message in the "network-wide AP-home forwarding device correspondence table", and obtains information of the home forwarding device corresponding to the leaving-network AP. The signaling control subnet notifies the home forwarding device of the leaving-network AP of the terminal, called the original home forwarding device, and the original home forwarding device caches downlink data of the terminal. The size of the cache pool, enter and leave policy, and overflow policy are not covered in the present patent.

In the present embodiment, when the terminal enters the network, the signaling control subnet searches for the home forwarding device corresponding to the AP in the entering-network message in the "network-wide AP-home forwarding device correspondence table", obtains information of the home forwarding device (called the current home forwarding device) corresponding to the entering-network AP. The signaling control subnet calculates uplink and downlink forwarding policies and paths related to the terminal, and generates the relevant forwarding flow table and issues it to each forwarding device on the forwarding path in the data exchange subnet, and each of the forwarding devices updates the forwarding flow table so that the uplink and downlink data can be correctly and timely delivered after the terminal moves. At the same time, the signaling control sub-net notifies the original home forwarding device to forward the downlink data cached when the terminal is offline to the current home forwarding device.

In the following, specific embodiments will be used to describe the service processing of the present document in detail.

Figure 6:
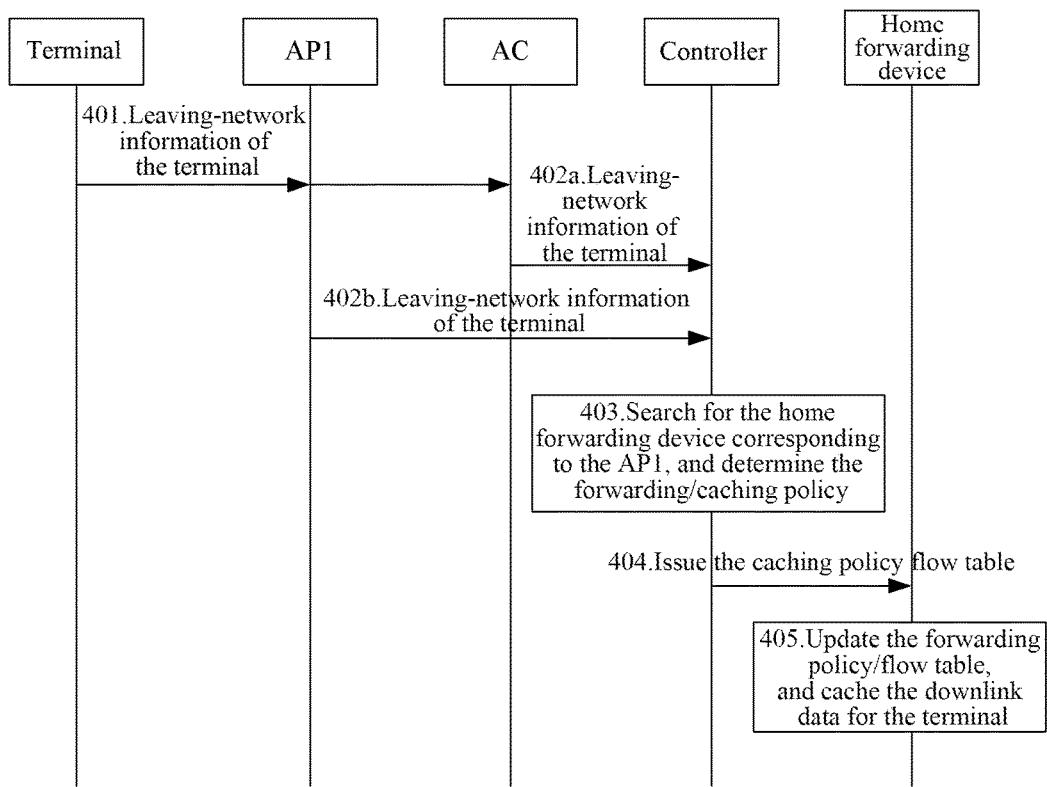
FIG. 6 is a flow chart of a terminal moving out of a network in accordance with an embodiment of the present document.

FIG. 6 is the flow chart of a terminal moving out of the network in accordance with the first embodiment of the present document, wherein the AP1 is the radio access device of the terminal, the AC is the AP controller, the home forwarding device 1 is the AP1's home forwarding device, the scenario is that the terminal leaves from the network at the AP1, as shown in FIG. 6, comprising the following steps:

401, the terminal or the AP1 initiates a leaving-network process, and the terminal sends a leaving-network message to the AP1;

402a, the AC notifies the network controller of the terminal's leaving-network message, and the message comprises a leaving-network identifier, a network identifier of the terminal, a network identifier of the AP, as well as other relevant information of the terminal and the AP; or, proceeds to the step 402b, 402b, the AP1 notifies the network controller of the terminal's leaving-network message that comprises the network identifier of the terminal, the network identifier of the AP, as well as other relevant information of the terminal and the AP;

403, the network controller searches for the home forwarding device corresponding to the AP in the "network-wide AP-home forwarding device correspondence table" according to the AP MAC in the leaving-network information of the terminal, and obtains the home forwarding device 1 corresponding to the leaving-network AP.

The network controller can determine the forwarding/caching policy according to the pre-configuration policy, the network state, and/or the user subscription information; and save/update the terminal's leaving-network device information, comprising: the leaving-network identifier, the network identifier of the terminal, the MAC of the access device AP1, and the network identifier of the home forwarding device 1;

404, the network controller issues the caching policy flow table and updates it to the home forwarding device 1;

405, the home forwarding device 1 updates the forwarding policy/flow table, and caches the downlink data destined to the terminal. The size of the caching pool, the enter policy and the leave policy, and the overflow policy are not within the scope of the present patent.

Figure 7:
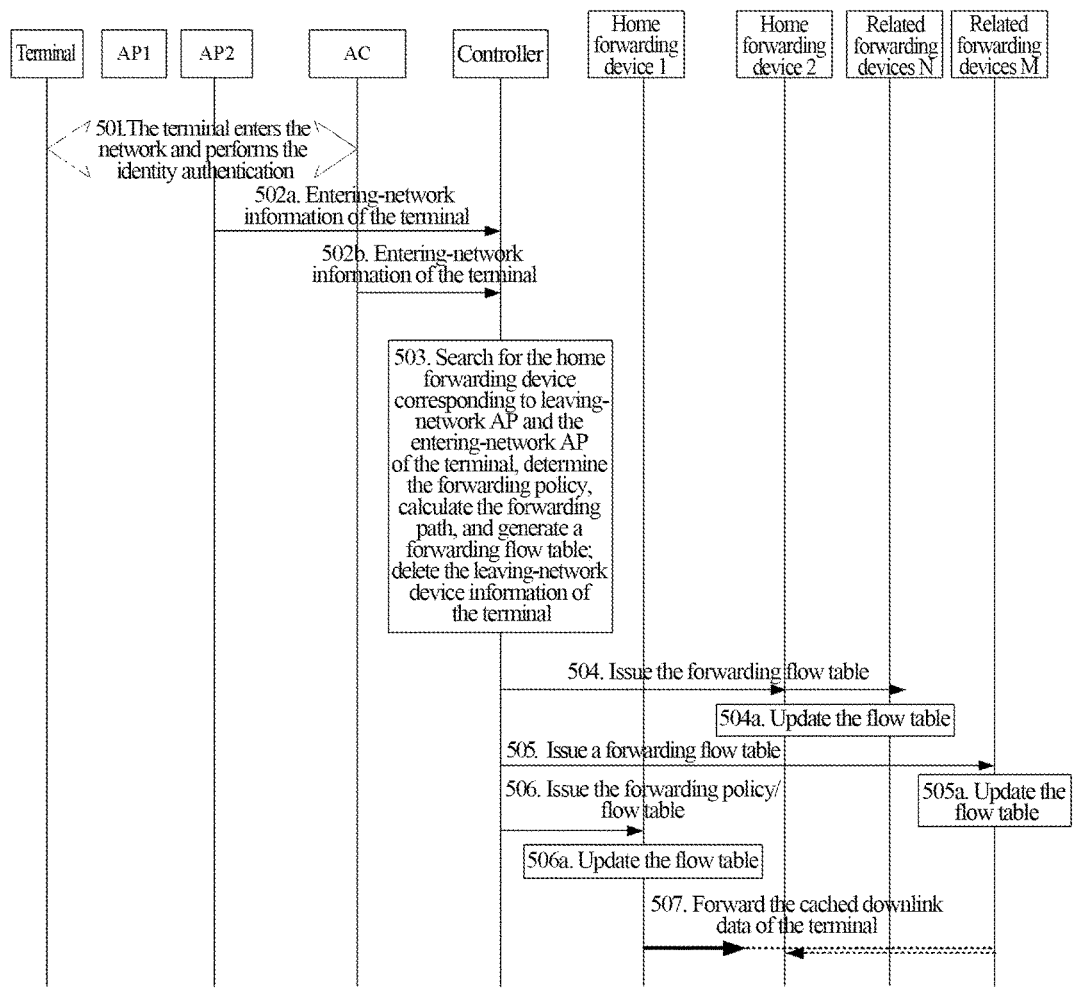
FIG. 7 is a flow chart of a terminal moving into a network in accordance with an embodiment of the present document.

FIG. 7 is a flow chart of the terminal moving into the network in accordance with the first embodiment of the present document. The terminal switches from the radio access device AP1 to the AP2, the AC is the AP controller, the home forwarding device 1 is the AP1's home forwarding device, and the home forwarding device 2 is the AP2's home forwarding device, the scenario is the terminal moving into the network at the AP2, and the AP1 and the AP2 have different home forwarding devices, as shown in FIG. 7, comprising the following steps:

501, the terminal switches to the AP2 and completes the identity authentication;

502, the AP2 notifies the network controller of the entering-network information of the terminal, and the information comprises the entering-network identifier, the network identifier of the terminal, the network identifier of the AP2, and other relevant information of the terminal and the AP2, such as the current air interface rate of the terminal and the AP2, information of adjacent AP; the entering-network information may be directly notified by the AP2 to the network controller, that is, step 502a, and can also be notified by the AC to the network controller, that is, step 502b;

503, the network controller searches for the leaving-network device information of the terminal according to the terminal network identifier in the entering-network information of the terminal, and obtains information of the home forwarding device 1, the network controller finds out the home forwarding device 2 corresponding to the AP2 in the "network-wide access device—home forwards device correspondence table" according to the AP2 MAC in the entering-network information of the terminal;

the network controller determines the forwarding policy, calculates the forwarding path, and generates a forwarding flow table; in the present embodiment, the network controller can determine the forwarding policy according the to pre-configuration policy, the network state, and/or the user subscription information and other information, and generates a forwarding flow table for the home forwarding device 2 and related forwarding devices N on the path (the path refers to the path for external communication after the terminal switches to the AP2); calculates the forwarding path from the home forwarding device 1 to the home forwarding device 2, generates a forwarding flow table which notifies to forward the cache data for the home forwarding device 1, and generates a forwarding flow table for the relevant forwarding devices M on the path, (N and M may be 0, 1 or more, the network controller generates a flow table for each controlled forwarding device); the network controller may save the entering-network device information of the terminal (including: the network identifier of the terminal, access AP information AP2 MAC, and the network identifier of the home forwarding device), and deletes the leaving-network device information of the terminal;

504, the network controller issues the policy/forwarding flow table to the home forwarding device 2 and the related forwarding devices N;

504a, the home forwarding device 2 and the related forwarding devices N update the flow table;

505, the network controller issues the flow table to the relevant forwarding devices M;

505a, the relevant forwarding devices M update the flow table;

506, the network controller issues a forwarding flow table that notifies forwarding the cached data to the home forwarding device 1;

506a, the home forwarding device 1 updates the flow table;

507, the home forwarding device 1 forwards the cached downlink data of the terminal to the home forwarding device 2, and if there exist related forwarding devices M between them, the data is forwarded by the relevant forwarding devices to the home forwarding device 2.

Figure 8:
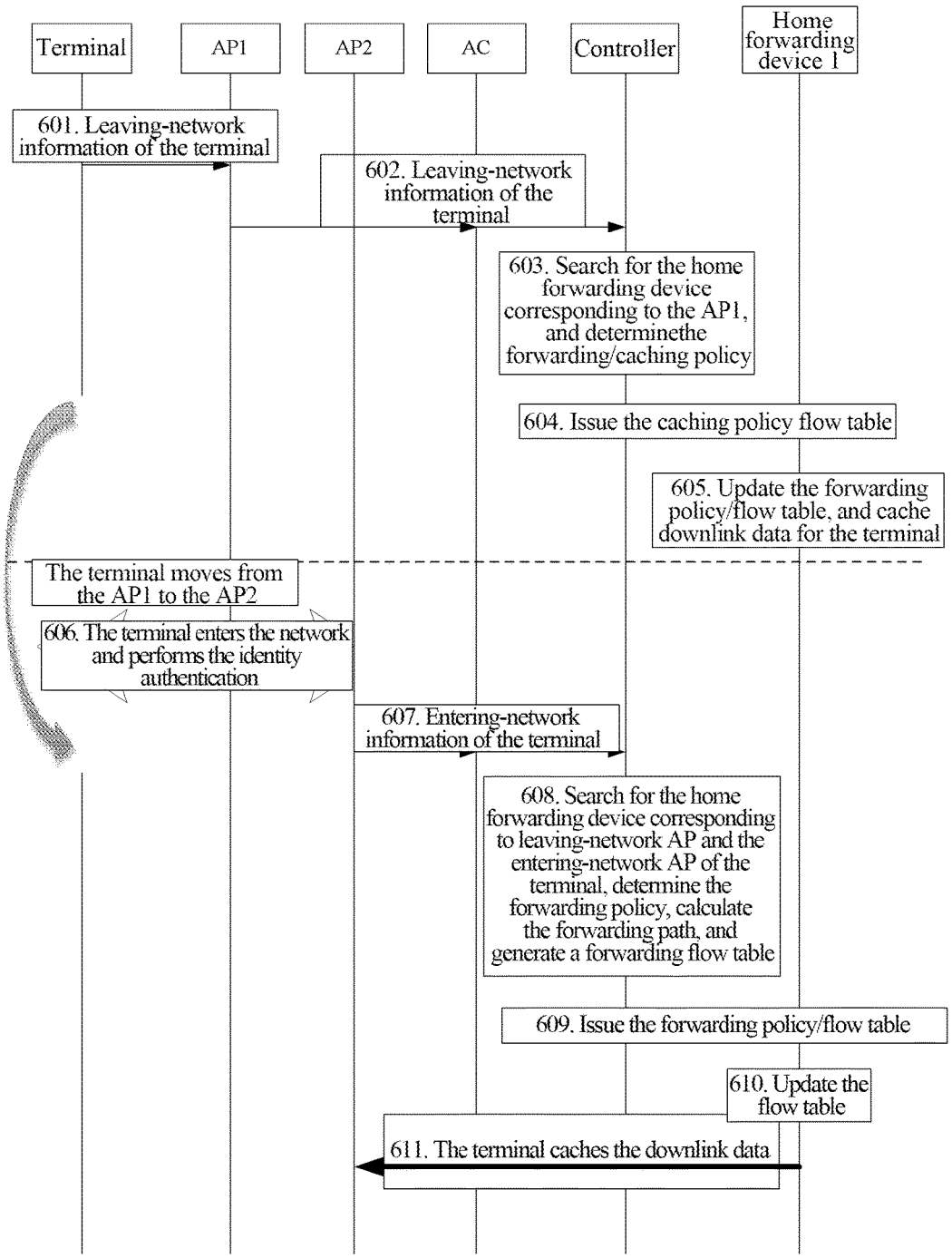
FIG. 8 is a flow chart of a terminal moving and switching access devices in accordance with an embodiment of the present document.

FIG. 8 is a flow chart of the terminal moving and switching the access device in accordance with the embodiment of the present document. In the present embodiment, the terminal switches from the radio access device AP1 to the AP2, the AC is the AP controller, the home forwarding device 1 is the AP1's home forwarding device and also the AP2's home forwarding device, and the home forwarding devices of the radio access devices AP1 and AP2 before and after the terminal moves have the same home forwarding device, as shown in FIG. 8, comprising the following steps:

601, the terminal or the AP1 initiates the leaving-network process, and the terminal sends a leaving-network message to the AP1;

602, the AP2 or the AC notifies the network controller of the leaving-network information of the terminal, and the information comprises the leaving-network ID, the network identifier of the terminal, the network identifier of the AP1, and other relevant information of the terminal and the AP1;

603, the network controller searches for the home forwarding device corresponding to the AP in the "network-wide AP-home forwarding device correspondence table" according to the AP1 MAC in the leaving-network message of the terminal, and obtains the home forwarding device 1 corresponding to the leaving-network AP.

The network controller can determine the forwarding/caching policy according to the pre-configuration policy, the network state, and/or the user subscription information; saves/updates the leaving-network device information of the terminal, comprising: the leaving-network identifier, the network identifier of the terminal, the radio access device AP1 MAC, and the network identifier of the home forwarding device 1;

604, the network controller issues and updates the caching policy flow table to the home forwarding device 1;

605, the home forwarding device 1 updates the forwarding policy/flow table, caches the downlink data destined for the terminal. The size of the caching pool, the enter-and-leave policy, and the overflow policy are not within the scope of the present patent.

606, the terminal switches to the AP2 and completes the identity authentication;

607, the AP2 or the AC notifies the network controller of the entering-network information of the terminal, and the information comprises the entering-network ID, the network identifier of the terminal, the network identifier of the AP2, and other relevant information of the terminal and the AP2, such as the current air interface rate of the terminal and the AP2, information of the adjacent AP, and so on;

608, the network controller searches for the leaving-network device information of the terminal according to the terminal network identifier in the entering-network information of the terminal, and obtains information of the home forwarding device 1, the network controller finds out the home forwarding device 1 corresponding to the AP2 in the "network-wide access device—home forwards device correspondence table" according to the AP2 MAC in the entering-network information of the terminal;

in the present embodiment, the AP1 and the AP2 have the same home forwarding device. The network controller updates the policy/forwarding flow table for the home forwarding device 1; the network controller may save the entering-network device information of the terminal (including: the network identifier of the terminal, the access AP information: AP2 MAC, the network identifier of the home forwarding device), and deletes the leaving-network device information of the terminal;

609, the network controller issues the forwarding policy/flow table to the home forwarding device 1;

610, the home forwarding device 1 updates the flow table;

611, the home forwarding device 1 forwards the cached downlink data of the terminal to the AP2.

In the case that the AP and the home forwarding device are not directly connected, the forwarding may also through other low-layer switching devices, which is the relevant technology well known to those skilled in the art, has nothing to do with the present document and will no longer be repeated.

In the steps 403, 503 and 603 in the abovementioned embodiment, the network controller can also modify the time length and size for the home forwarding device caching the data according to the policy configuration and settings, and can notify the controlled forwarding devices to modify the caching configuration in steps 404, 504, 604 or 609. The size of the caching pool, the enter-and-leave policy and the overflow policy are not within the scope of the present patent.

Figure 9:
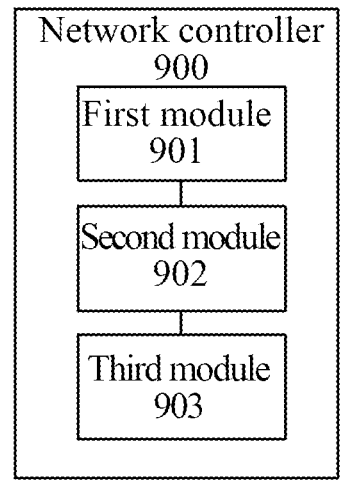
FIG. 9 a schematic diagram of a network controller in accordance with an embodiment of the present document.

FIG. 9 is a schematic diagram of the network controller in accordance with the embodiment of the present document, as shown in FIG. 9, the network controller 900 of the present embodiment comprises:

A first module 901, configured to, after learning that the terminal leaves the network, acquire information of the home forwarding device when the terminal leaves the network; determine a caching policy flow table, and send the caching policy flow table to the home forwarding device;

A second module 902, configured to: after learning that the terminal switches, acquire information of the home forwarding device before the terminal switches and the information of the current home forwarding device of the terminal; determine the forwarding policy, calculate a forwarding path from the home forwarding device before the terminal switches to the current home forwarding device of the terminal; generate a forwarding flow table which is used to forward the cached data to the current home forwarding device for the home forwarding device before the terminal switches, and issue the forwarding flow table to the home forwarding device before the terminal switches and the forwarding devices on the forwarding path.

Wherein, the first module 901 acquiring the information of the home forwarding device when the terminal leaves the network in the following manner: in the maintained network-wide access device and home forwarding device corresponding table, searching for the home forwarding device corresponding to the media access control address of the access device when the terminal leaves the network.

Wherein, the second module 902 acquiring information of the home forwarding device before the terminal switches in the following manner: searching for the leaving-network device information of the terminal according to the network identifier of the terminal, and acquiring information of the home forwarding device before the terminal switches from the leaving-network device information of the terminal; and acquiring the information of the current home forwarding device of the terminal comprises: searching for information of the home forwarding device corresponding to the media access control address of the access device in entering-network information of the terminal in the maintained network-wide access device and home forwarding device correspondence table.

In a preferred embodiment, the network controller may further comprise:

A third module 903, configured to save or update the leaving-network device information of the terminal, wherein the leaving-network device information of the terminal comprises: the leaving-network identifier, the network identifier of the terminal, access device information when the terminal leaves the network, and the network identifier of the home forwarding device; used to save or update the entering-network device information of the terminal and delete the leaving-network device information of the terminal, wherein the entering-network device information of the terminal comprises: the network identifier of the terminal, the access device information, and the network identifier of the home forwarding device.

Figure 10:
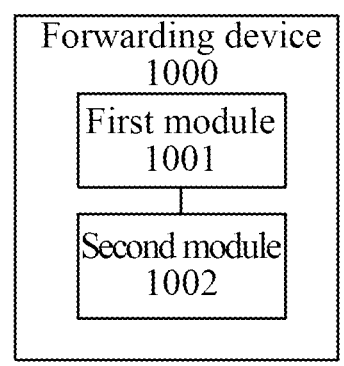
FIG. 10 is a schematic diagram of a forwarding device in accordance with an embodiment of the present document.

FIG. 10 is a schematic diagram of the forwarding device in accordance with the embodiment of the present document, as shown in FIG. 10, the forwarding device 1000 of the present embodiment comprises:

A first module 1001, configured to receive a caching policy flow table issued by the network controller, and cache downlink data of the specified terminal according to the caching policy flow table;

A second module 1002, configured to receive the forwarding flow table issued by the network controller, and forward the cached downlink data to the specified forwarding device according to the forwarding flow table.

The embodiment of the present document provides a method for supporting WLAN terminal mobility in an IP network architecture in which the control and forwarding are separated, the data forwarding device and the network controller respectively maintain the local and network-wide access device and home forwarding device correspondence table, and the signaling control subnet obtains the leaving-network message of the terminal, and searches for the home forwarding device corresponding to the leaving-network AP in the "network-wide access device—home forwarding devices correspondence table", generates the caching strategy, issues the policy/flow table message to the home forwarding device of the leaving-network AP to refresh the forwarding policy, so that the home forwarding device of the leaving-network AP timely caches the terminal's downlink data (the data sent from the terminal to the network side are referred to as uplink data, and data in the reverse direction are called downlink data); the signaling control subnet obtains the entering-network message of the terminal, searches for the home forwarding device corresponding to the entering-network AP in the "network-wide access device—home forwarding device correspondence table", calculates a update path generating and forwarding table, and issues a policy/flow table message to notify the home forwarding device of the leaving-network AP to forward the cached terminal data to the home forwarding device of the entering-network AP, and issues the policy/flow table message to the home forwarding device of the entering-network AP and respective forwarding devices on the updated path in the data exchange subnet, updates the uplink and downlink forwarding paths of the device data, so as to maintain the service continuity.

Thus, a single carrier network can forward data and support the IP mobility, to avoid overlaying another set of network protocol to support the IP mobility (such as MIP/PMIP protocol), and also seamlessly integrate with the network architecture in which the control and forwarding are separated.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document, and of course, the present document may have other various embodiments, and a person skilled in the art can make a variety of modifications and changes on the present document without departing from the spirit and essence of the present document, and these modifications and changes should belong to the protection scope of the appended claims of the present document.

INDUSTRIAL APPLICABILITY

The embodiment of the present document provides a service processing method, a network controller and a forwarding device to maintain the service continuity after an WLAN terminal switches to a new radio access device in the IP network architecture in which the control and forwarding are separated.

What is claimed is:

1. A service processing method, comprising:
after learning that a wireless local area network (WLAN) terminal leaves a network, a network controller acquiring information of a home forwarding device that is used when the WLAN terminal leaves the network;
the network controller determining a caching policy flow table, and sending the caching policy flow table to the home forwarding device to instruct the home forwarding device to cache downlink data of the WLAN terminal, and the home forwarding device caching the downlink data of the WLAN terminal according to the caching policy flow table received from the network controller;
wherein the network controller maintains a correspondence table of all access devices and home forwarding devices used in an Internet Protocol (IP) network in which control and forwarding are separated, and the network controller acquiring information of the home forwarding device that is used when the WLAN terminal leaves the network comprises:
the network controller searching, in the maintained correspondence table of all access devices and home forwarding devices used in the IP network in which control and forwarding are separated, for the home forwarding device corresponding to a media access control address of an access device accessed by the WLAN terminal when the WLAN terminal leaves the network.

2. The method of claim 1, wherein, after the network controller acquires the information of the home forwarding device that is used when the WLAN terminal leaves the network, the method further comprises:
the network controller saving or updating leaving-network device information of the WLAN terminal, wherein the leaving-network device information of the WLAN terminal comprises: a leaving-network identifier, a network identifier of the WLAN terminal, access device information when the WLAN terminal leaves the network, and a network identifier of a corresponding home forwarding device.

3. A service processing method, comprising:
after learning that a wireless local area network (WLAN) terminal switches, a network controller acquiring information of a home forwarding device that is used before the WLAN terminal switches and information of a current home forwarding device of the WLAN terminal;
the network controller determining a forwarding policy, and calculating a forwarding path from the home forwarding device used before the WLAN terminal switches to the current home forwarding device of the WLAN terminal; and
the network controller generating a forwarding flow table for the home forwarding device used before the WLAN terminal switches, and issuing the forwarding flow table to the home forwarding device used before the WLAN terminal switches and forwarding devices on the forwarding path to instruct the home forwarding device used before the WLAN terminal switches to forward downlink data of the WLAN terminal cached, according to a caching policy flow table received from the network controller, by the home forwarding device used before the WLAN terminal switches to the current home forwarding device of the WLAN terminal;
wherein, the network controller maintains a correspondence table of all access devices and home forwarding devices used in an Internet Protocol (IP) network in which control and forwarding are separated, and the network controller acquiring information of the current home forwarding device of the WLAN terminal comprises:
the network controller searching, in the maintained correspondence table of all access devices and home forwarding devices used in the IP network in which control and forwarding are separated, for information of the current home forwarding device corresponding to a media access control address of an access device accessed by the WLAN terminal in entering-network information of the WLAN terminal.

4. The method of claim 3, wherein, the network controller acquiring information of a home forwarding device that is used before the WLAN terminal switches comprises:
the network controller searching for leaving-network device information of the WLAN terminal according to a network identifier of the WLAN terminal, and acquiring the information of the home forwarding device that is used before the WLAN terminal switches from the leaving-network device information of the WLAN terminal.

5. The method of claim 3, wherein, after the network controller acquires the information of the home forwarding device that is used before the WLAN terminal switches and the information of the current home forwarding device of the WLAN terminal, the method further comprises:
the network controller saving or updating entering-network device information of the WLAN terminal and deleting leaving-network device information of the WLAN terminal, wherein the entering-network device information of the WLAN terminal comprises: a network identifier of the WLAN terminal, access device information, and a network identifier of a home forwarding device.

6. A network controller, comprising:
a first module, configured to, after learning that a wireless local area network (WLAN) terminal leaves a network, acquire information of a home forwarding device that is used when the WLAN terminal leaves the network; determine a caching policy flow table, and send the caching policy flow table to the home forwarding device to instruct the home forwarding device to cache downlink data of the WLAN terminal; and
a second module, configured to: after learning that the WLAN terminal switches, acquire information of the home forwarding device that is used before the WLAN terminal switches and information of a current home forwarding device of the WLAN terminal; determine a forwarding policy, calculate a forwarding path from the home forwarding device used before the WLAN terminal switches to the current home forwarding device of the WLAN terminal; and generate a forwarding flow table for the home forwarding device used before the WLAN terminal switches, and issue the forwarding flow table to the home forwarding device used before the WLAN terminal switches and forwarding devices on the forwarding path to instruct the home forwarding device used before the WLAN terminal switches to forward downlink data of the WLAN terminal cached, according to the caching policy flow table received from the network controller, by the home forwarding device used before the WLAN terminal switches to the current home forwarding device of the WLAN terminal;
wherein the network controller maintains a correspondence table of all access devices and home forwarding devices used in an Internet Protocol (IP) network in which control and forwarding are separated, and the first module acquires information of the home forwarding device that is used when the WLAN terminal leaves the network in the following manner:
searching, in the maintained correspondence table of all access devices and home forwarding devices used in the IP network in which control and forwarding are separated, for the home forwarding device corresponding to a media access control address of an access device accessed by the WLAN terminal when the WLAN terminal leaves the network.

7. The network controller of claim 6, wherein,
the second module acquires the information of the home forwarding device that is used before the WLAN terminal switches in the following manner: searching for leaving-network device information of the WLAN terminal according to a network identifier of the WLAN terminal, and acquiring the information of the home forwarding device before the WLAN terminal switches from the leaving-network device information of the WLAN terminal; and
the second module acquires the information of the current home forwarding device of the WLAN terminal in the following manner: in the maintained correspondence table of all access devices and home forwarding devices used in the IP network in which control and forwarding are separated, searching for information of the current home forwarding device corresponding to a media access control address of an access device accessed by the WLAN terminal in entering-network information of the WLAN terminal.

8. The network controller of claim 6, further comprising:
a third module, configured to save or update the leaving-network device information of the WLAN terminal, wherein the leaving-network device information of the WLAN terminal comprises: a leaving-network identifier, a network identifier of the WLAN terminal, access device information when the WLAN terminal leaves the network, and a network identifier of a home forwarding device; and
save or update the entering-network device information of the WLAN terminal and delete the leaving-network device information of the WLAN terminal, wherein the entering-network device information of the WLAN terminal comprises: a network identifier of the WLAN terminal, access device information, and a network identifier of a home forwarding device.

9. A service processing method, comprising:
a forwarding device that is used when a wireless local area network (WLAN) terminal leaves a network receiving a caching policy flow table issued by a network controller after the WLAN terminal leaves the network; and
the forwarding device caching downlink data of the WLAN terminal according to the caching policy flow table received from the network controller;
wherein, the network controller maintains a correspondence table of all access devices and home forwarding devices used in an Internet Protocol (IP) network in which control and forwarding are separated, and the network controller acquires information of the forwarding device that is used when the WLAN terminal leaves the network by:
the network controller searching, in the maintained correspondence table of all access devices and home forwarding devices used in the IP network in which control and forwarding are separated, for the forwarding device corresponding to a media access control address of an access device accessed by the WLAN terminal when the WLAN terminal leaves the network.

10. The method of claim 9, wherein, after the forwarding device caches the downlink data of the WLAN terminal according to the caching policy flow table, the method further comprises:
the forwarding device receiving a forwarding flow table issued by the network controller; and
the forwarding device forwarding the cached downlink data to a specified forwarding device according to the forwarding flow table.

* * * * *